United States Patent [19]

Phillips et al.

[11] Patent Number: 4,672,685
[45] Date of Patent: Jun. 9, 1987

[54] DUAL BAND ANTENNA HAVING SEPARATE MATCHED INPUTS FOR EACH BAND

[75] Inventors: James P. Phillips, Lake in the Hills; Robert A. Gunther, Elmwood Park, both of Ill.

[73] Assignee: Motorola, Inc., Schaumburg, Ill.

[21] Appl. No.: 816,011

[22] Filed: Jan. 3, 1986

[51] Int. Cl.⁴ .......................... H04B 1/38; H01Q 1/24
[52] U.S. Cl. ......................................... 455/89; 455/90; 343/702; 343/846; 343/860
[58] Field of Search ................... 455/73, 82, 83, 89, 455/272, 90; 343/702, 724, 745, 749, 845, 846, 850, 852, 858; 333/17 M

[56] References Cited

U.S. PATENT DOCUMENTS

| | | |
|---|---|---|
| 3,622,884 | 1/1971 | Kent . |
| 3,838,429 | 1/1974 | Reggia ............................... 343/750 |
| 4,160,210 | 1/1979 | Molinari . |
| 4,313,119 | 1/1982 | Garay et al. ....................... 343/702 |
| 4,356,492 | 10/1982 | Kaloi ................................. 343/846 |
| 4,571,595 | 2/1986 | Phillips et al. .................... 343/702 |

OTHER PUBLICATIONS

Yukio Yokoyama, Dual-Resonance Broadband Microstrip Antenna, in Proceedings of ISAP '85, approximately Jun., 1985.

Primary Examiner—Jin F. Ng
Attorney, Agent, or Firm—Charles L. Warren

[57] ABSTRACT

This dual input antenna system has a first input which provides an impedance match over a first range of frequencies and a second input which provides an impedance match over a second range of frequencies. This effectively enables a narrow band antenna to operate and provide a matched condition at two separate frequency ranges. First and second longitudinal radiating elements are connected at respective ends by an approximate ½ wavelength transmission line. The other end of each radiating element is connected by transmission lines to a receive filter and transmit filter, respectively. The receive and transmit filters provide a substantial reactance outside of the respective passbands. The wavelengths of the first and second transmission lines are selected to transform the reactance of each filter into a value which will provide a match condition for the other transmission line at the respective frequency ranges.

20 Claims, 4 Drawing Figures

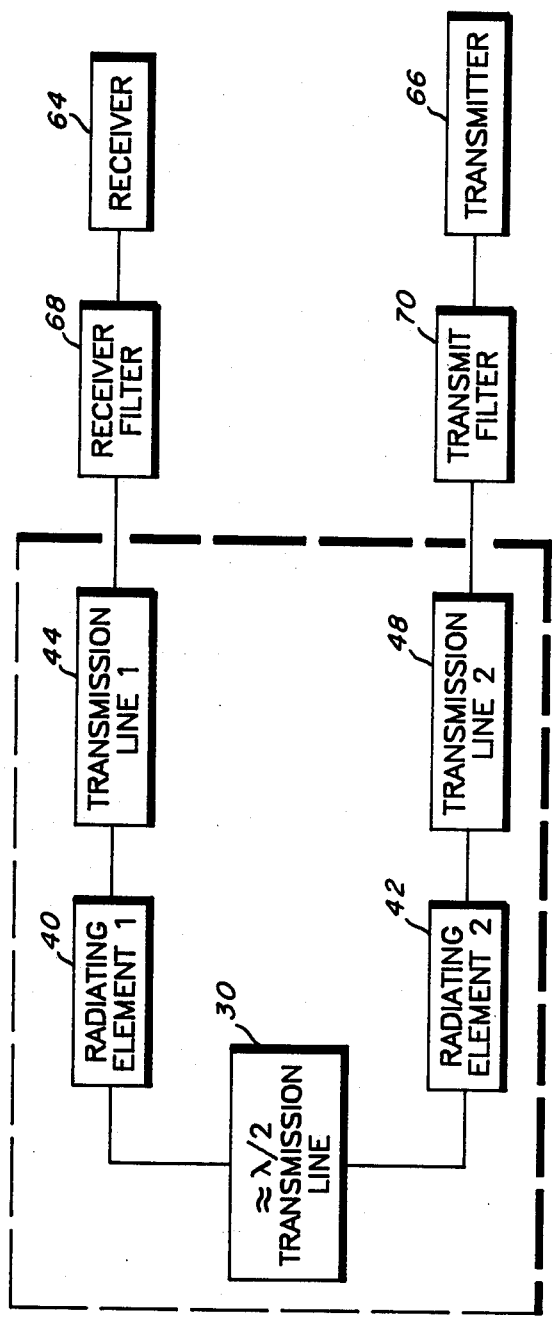

DUAL BAND ANTENNA HAVING SEPARATE MATCHED INPUTS FOR EACH BAND

BACKGROUND OF THE INVENTION

This invention relates to relatively narrow band antennas used with hand-held communications equipment. The invention is more specifically directed to such antennas which are disposed within the housing of the hand-held communications equipment.

Portable two-way radios have utilized a variety of antennas. One of the more common antennas used for such applications is a monopole. The use of a telescoping monopole is convenient since it can be retracted when not in use.

Antennas which are located within the housing of the portable communications equipment (subsequently referred to as an internal antenna) are desirable from the user's perspective. It eliminates a projecting external antenna which is subject to damage and may make a hand-held radio awkward to handle. Because of size limitations, internal antennas are often shorter than external antennas for the same frequency and have a narrower bandwidth.

When a conventional single input internal antenna is required to operate at two widely separated frequencies such as for separate transmit and receive frequencies, a matching circuit has been used in order to provide a reasonable impedance match at both frequencies. For example, U.S. Pat. No. 4,571,595 entitled DUAL BAND TRANSCEIVER ANTENNA (corresponding to Ser. No. 558,270) provides a matching circuit in order to cover two separated frequency bands.

A conventional two-way radio having separate transmit and receive frequencies utilizes a duplexer circuit which serves to simultaneously couple the transmitter output and the receiver input to a common antenna. The duplexer serves to isolate the transmitter and receiver from each other.

SUMMARY OF THE INVENTION

It is an object of this invention to provide an internal antenna capable of operating in two separated frequency bands and providing a matched input for the transmitter at one frequency band and a separate matched input for the receiver at a different frequency band.

An embodiment of the invention includes two spaced apart radiating elements connected to each other by a transmission line of approximately one half wavelength. One end of each radiating element is connected by this transmission line. The other end of the first radiating element is coupled by a first transmission line to a bandpass filter which is coupled to the receiver. The other end of the second radiating element is coupled by a second transmission line to a bandpass filter which is connected to the transmitter. The receiver bandpass filter presents a large reactance to the first transmission line at the transmit frequencies and the transmit bandpass filter presents a large reactance to the second transmission line for the received frequency range. The length of the first transmission line is selected to reflect an impedance such that the second transmission line provides a reasonable match to the output of the transmitter bandpass filter in the transmit frequency range. Similarly, the length of the second transmission line is selected to reflect an impedance which causes the first transmission line coupled to the bandpass filter of the receiver to present a reasonable match to the receiver bandpass filter over the receiver range of frequencies. Thus, separate matched transmit and receive frequency inputs are provided by the antenna according to the present invention.

BRIEF DESCRIPTION OF THE DRAWINGS

FIG. 3 is a block diagram illustrating the present invention as coupled to a two-way radio.

DETAILED DESCRIPTION

Figure 1:
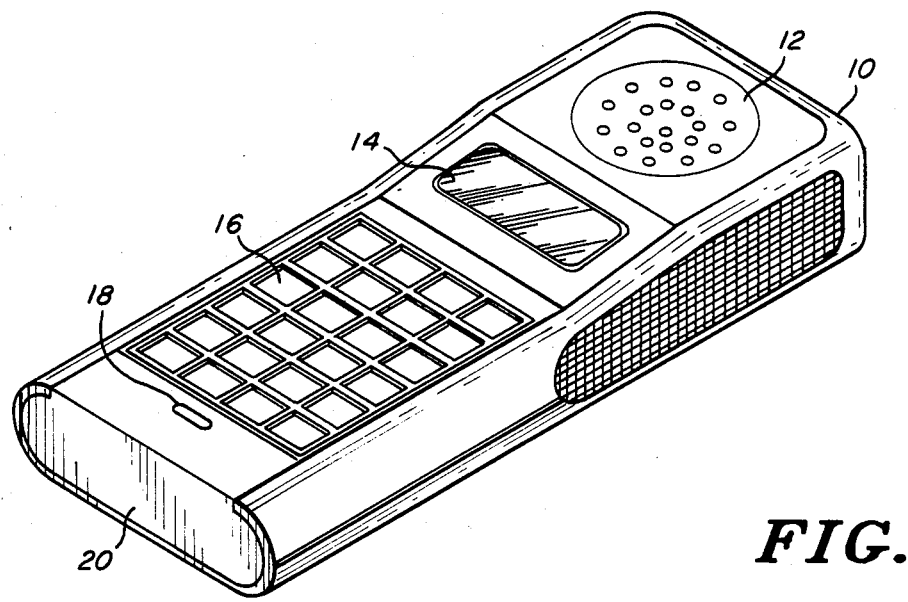
FIG. 1 is a perspective view of a hand-held two-way radio which utilizes an antenna according to the present invention.

FIG. 1 illustrates a hand-held two-way radio 10 having a speaker 12, a visual display 14, an input keypad 16, and a microphone port 18. An internal antenna according to the present invention is located in the bottom 20 portion of radio 10. Since an internal antenna is used, it will be apparent that the portion of the housing of radio 10 in the vicinity of the antenna should be made of a material which does not substantially interfere with the ability of the antenna to radiate and receive radio frequency energy.

Figure 2:
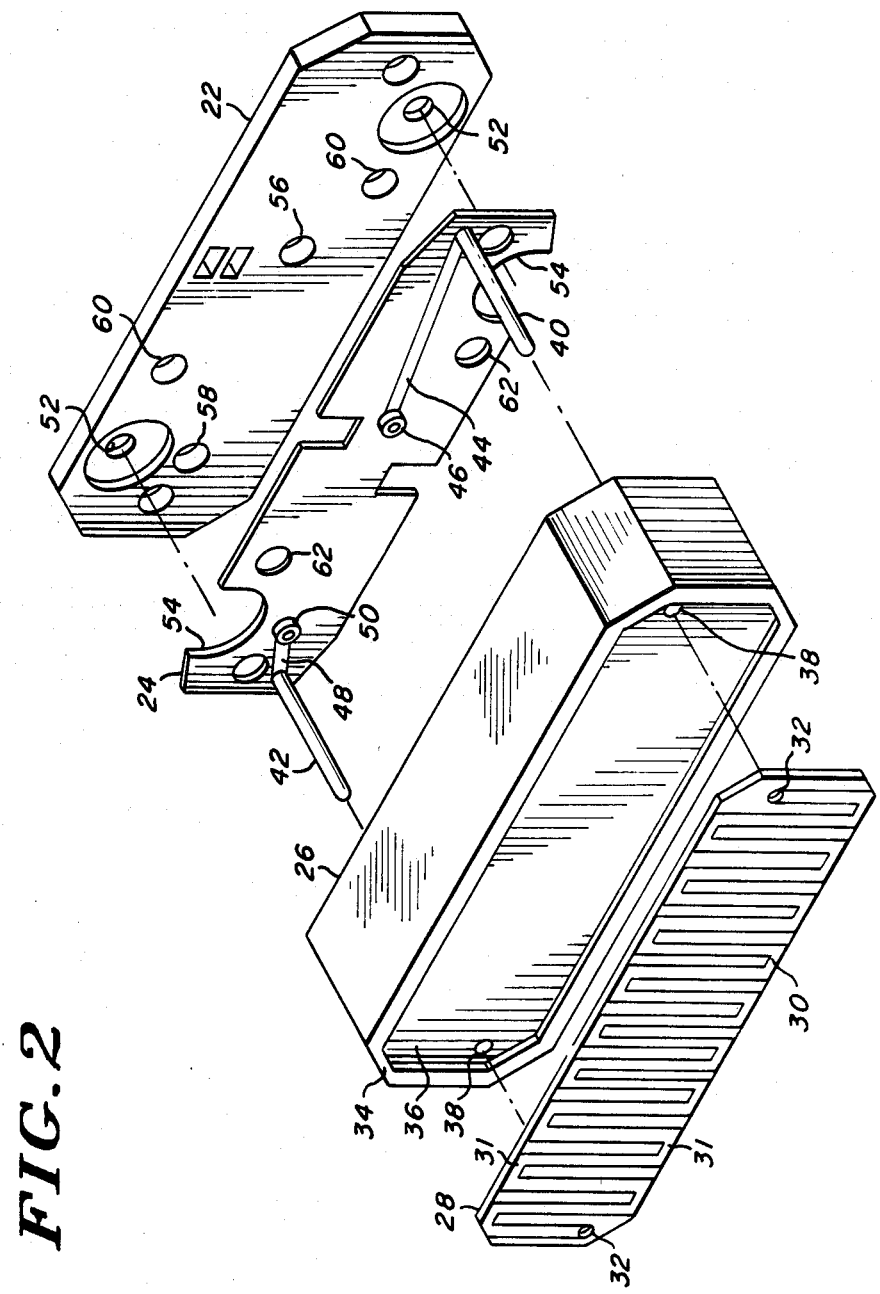
FIG. 2 illustrates an exploded view of the antenna according to the present invention.

FIG. 2 illustrates an embodiment of an antenna according to the present invention which is located at the bottom 20 of radio 10. The major elements shown in FIG. 2 include a metal mounting plate 22, printed circuit board 24, a plastic spacer 26 and printed circuit board 28.

A serpentine copper pattern 30 extends between holes 32 in printed circuit board 28. The printed circuit board is dimensioned to fit within the peripheral lip 34 on spacer 26 against surface 36. Holes 38 extend through spacer 26 and are in alignment with holes 32.

Metal rods 40 and 42 which comprise the radiating elements of the antenna are mounted to board 24 and are aligned to project through holes 38 and 32. The distal ends of rods 40 and 42 are soldered to the respective ends of the serpentine pattern 30 on board 28. The attached end (base) of rod 40 is connected to a receptacle 46 by a conductor 44 on the surface of board 24. Similarly, the attached end of rod 42 is connected to receptacle 50 by a conductor 48. Holes in the board 24 aligned with receptacles 46 and 50 permit connections to be made with each from the side of the board not seen in FIG. 2.

Metal plate 22 has two holes 52 which are countersunk. These holes permit the plate 22 to be secured to the chassis of radio 10 by screws. Cutout portions 54 in board 24 align with the countersunk areas surrounding holes 52 to provide clearance for mounting screws. Holes 56 and 58 in plate 22 are aligned respectively with receptacles 46 and 50. These holes provide clearance permitting projecting pins from radio 10 to engage receptacles 46 and 50. Tapped holes 60 in plate 22 are aligned with holes 62 in board 24 and enable the board to be mounted to the plate by means of screws.

The elements as seen in FIG. 2 interact to provide the following functions. Plate 22 serves as a ground plane. Conductors 44 and 48 in combination with the ground plane form transmission lines which connect rods 40 and 42 to receptacles 46 and 50. The rods 40 and 42 form the radiating portions of the antenna structure. The serpentine pattern 30 on printed circuit board 28 cooperates with the ground plane to form a transmission line which connects the radiating elements 40 and 42.

In the diagram of FIG. 3 the box formed by dashed lines represents the antenna elements as seen in FIG. 2. Separate antenna inputs are provided by transmission lines 44 and 48. A receiver 64 is connected through a bandpass receive filter 68 to transmission line 44. The transmitter 66 is connected through bandpass filter 70 to transmission line 48. The transmission lines 44 and 48 are connected respectively to the radiating elements 40 and 42 which are in turn connected together by the approximate one half wavelength transmission line 30. The receiver, transmitter, and the respective filters are conventional.

Normally the receiver input and the transmitter output are designed for a given impedance, such as the commonly used 50 ohm impedance. The receiver receives a signal in one frequency range while the transmitter transmits a signal in another separated frequency range. The receive filter 68 presents a nominal 50 ohm impedance over the receive frequency range and presents a high reactance to frequencies in the transmit range. Similarly, the transmitter filter 70 presents a nominal 50 ohm impedance over the transmit frequency range but presents a large reactance to frequencies in the receive frequency range. The antenna according to this invention utilizes the reactance of the receive and transmit filters with respect to out of band frequencies to achieve a 50 ohm match at each input. This aspect will be explained more fully below.

The center design frequency is the geometric mean frequency of the lowest and highest frequencies. In a particular embodiment of the present invention, radiating element 40 and 42 are identical and selected to be 1/15th wavelength long at the center design frequency. However radiating elements greater than 1/20 wavelength and up to ¼ wavelength could be used. Transmission lines 44 and 48 have the same characteristic impedance, 50 ohms, as the nominal impedance of the receive and transmit filter 68 and 70, respectively. Since transmission line 30 is spaced a substantial distance with respect to ground plane 22, the characteristic impedance of transmission line 30 is substantially higher than that for transmission lines 44, 48. In the specific embodiment of the antenna, the characteristic impedance of transmission line 30 is approximately 900 ohms.

The following method can be utilized to adjust the present antenna so that its input connected to receive filter 68 provides a 50 ohm match at the receive frequencies and the input to the transmit filter 70 provides a 50 ohm match for the transmit frequency range. In this example, the radiating elements 40 and 42 are selected to be substantially identical. It has been determined that radiating elements of approximately 1/15th wavelength represent a good compromise between radiation efficiency and physical size. It will be understood of course that other lengths of radiating elements could be utilized. Elements greater than 1/20th wavelength but less than ¼ wavelength are preferred. The length of transmission line 30 is determined by providing a short circuit directly at the base of radiating element 40 and adjusting the length of the transmission line so that the impedance measured directly at the base of radiating element 42 is 50 ohms at the center design frequency.

The short circuit at the base of radiating element 40 is removed and the length of transmission line 44 is adjusted so that the impedance directly at the base of radiating element 42 is 50 ohms at the center frequency within the transmit frequency range. In the transmit frequency range the receive filter 68 presents a substantial reactance that is transformed by transmission line 44 into an appropriate reactance which is reflected through radiating element 40 and transmission line 30 to radiating element 42. The impedance coupled to radiating element 42 combines with its impedance to provide a 50 ohm termination.

A similar procedure is utilized to determine the length of transmission line 48 needed to provide a match for the receiver frequencies. Since transmission line 44 has a 50 ohm characteristic impedance, a means for measuring impedance may be utilized at the output of this transmission line rather than directly at the base of radiating element 40. With the transmit filter 70 coupled to transmitter 66 and to transmission line 48, the length of the transmission line 48 is adjusted until a 50 ohm termination is provided at the output of transmission line 44 at the center frequency in the receive frequency range. The transmit filter 70 provides a substantial reactance at the center receive frequency which is transformed by transmission line 48 and coupled through radiating element 42 and transmission line 30 to radiating element 40. The impedance coupled to radiating element 40 combined with its impedance results in a 50 ohm termination to the receive filter 68. It will be understood that because both transmission lines 44 and 48 have a characteristic 50 ohm impedance, the insertion of these transmission lines between the respective radiating elements and filters maintains the desired matching impedance.

A particular application of the present invention is disclosed in order to provide a specific example to assist in understanding the present invention. In the particular application, the transmit frequency range is 825-845 MHz, and the the receive frequency range is 870-890 MHz. These frequency ranges result in a geometric mean (center frequency) of 856.884 MHz. Each radiating element is 0.5 inches (1.27 cm) in height and 0.05 inches (0.127 cm) in diameter. The impedance of each radiating element at the center frequency is approximately 6 ohms resistive and 40 ohms reactive (inductive). The impedance of the radiating element is influenced by several factors including uniform current distribution along the element, the relatively small ground plane provided by plate 22, and the effect of a user's hand which is normally positioned on the radio near one of the radiating elements. Transmission line 30 has a characteristic impedance of approximately 900 ohms and when adjusted in accordance with the previously described method is 0.486 wavelengths at the center frequency. Although the particular example uses a transmission line 30 of approximately ½ wavelength, a wavelength of N/2 could be used where N is a positive integer greater than zero. The receive filter 68 is a six pole comb line ceramic type filter having a 50 ohm impedance in the receive frequency range. The transmit filter 70 is a five pole comb line ceramic type filter having an impedance of 50 ohms in the transmit frequency range. Transmission lines 44 and 48 each have a characteristic impedance of 50 ohms.

In order to match the transmit antenna input to 50 ohms, the length of transmission line 44 was adjusted to be 0.227 wavelengths in order to transform the high reactance presented by receive filter 68 at the transmit frequencies to a value that results in a 50 ohm impedance at the base of radiating element 42. An inductive reactance of approximately 60 ohms at the base of radiating element 40 results in the desired match at the transmit antenna input.

The length of transmission line 48 was adjusted to 0.532 wavelengths in order to transform the high reactance presented by the transmit filter 70 at the receive frequencies so that a 50 ohm match at the base of radiating element 40 results. A capacitive reactance of approximately 80 ohms at the base of radiating element 42 results in the desired match at the receive antenna input. Transmission lines 44 and 48 could also be extended by adding one half wavelength sections of transmission line which would maintain the same impedance.

Figure 4:
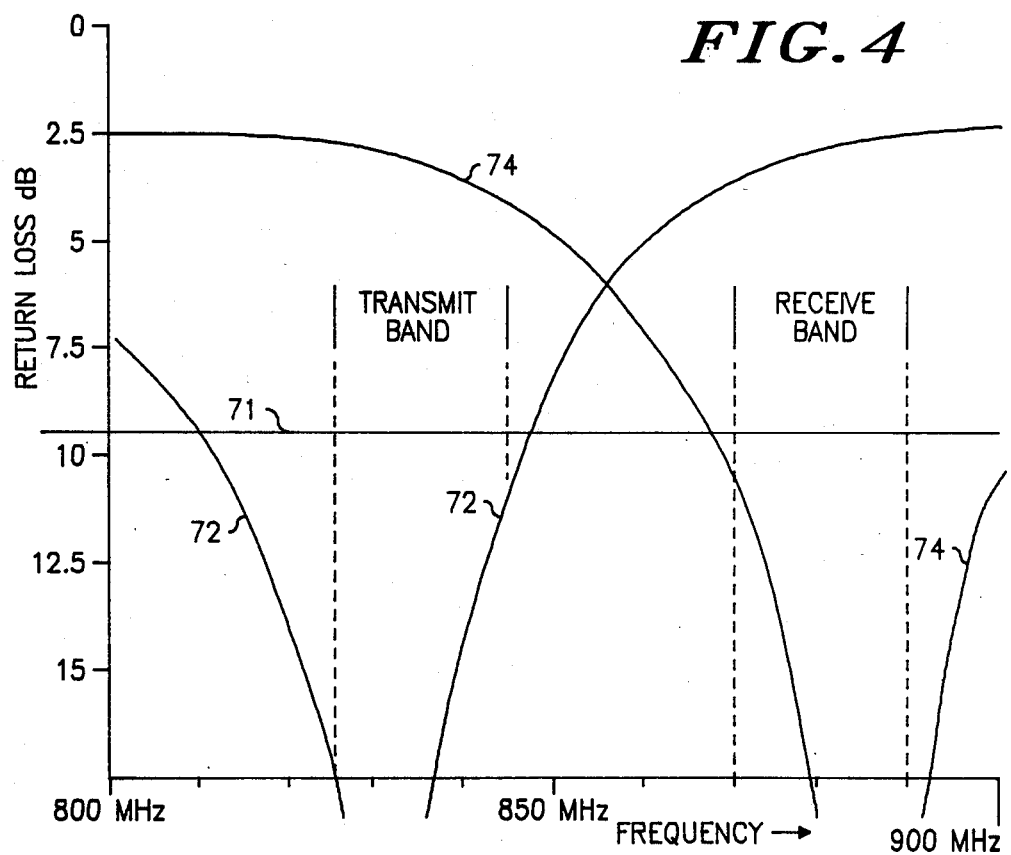
FIG. 4 is a graph of return loss versus frequency for each antenna input.

FIG. 4 illustrates two graphs in which the return loss in decibels is plotted versus frequency. The response of the transmit and receive inputs are indicated on the graph. A horizontal line 71 representing a standing wave ratio (SWR) of 2:1 is shown. The area below line 71 represents a SWR of less than 2:1. Graph line 72 illustrates return loss versus frequency for the transmit antenna input and graph line 74 illustrates return loss versus frequency for the antenna receive input. It will be noted by referring to the graphs that both the transmit and receive antenna inputs have return losses which correspond to a standing wave ratio of less than 2:1.

The present invention provides a receiver input coupled to a receiver filter which is matched to the characteristic impedance of the filter in the receive frequency range and a transmitter input coupled to a transmitter filter which is matched to the characteristic impedance of the filter in the transmit frequency range. The reactance presented by each filter for frequencies outside its passband is utilized to achieve the desired impedance for the antenna inputs.

Because the present antenna provides separate matched receive and transmit inputs, additional circuitry such as a duplexer or matching circuits is not needed in order to utilize the antenna for receiving and transmitting at separated frequencies. This antenna permits dual band operation of what is essentially a narrow band antenna.

Although an embodiment of the present invention has been described and illustrated in the drawings, the scope of the present invention is defined by the claims appended hereto.

What is claimed is:

1. An antenna having first and second inputs which correspond to first and second frequency ranges of operation of the antenna, the antenna comprising:
   first and second spaced apart radiating elements each having a base end and a distal end;
   first transmission line means for connecting the base end of said first radiating elements to a first filter having a predetermined impedance in the first frequency range and a substantial reactance in the second frequency range, the end of the first transmission line means which is connected to the first filter comprising said first input;
   second transmission line means for connecting the base end of said second radiating element to a second filter having a predetermined impedance in the second frequency range and a substantial reactance in the first frequency range, the end of the second transmission line means which is connected to the second filter comprising said second input;
   third transmission line means for connecting the distal ends of said first and second radiating elements, said third transmission line means having an electrical length intermediate the first and second frequency ranges of approximately N/2 wavelengths where N is an integer greater than zero;
   said first and second transmission line means having characteristic impedances equal to said predetermined impedances of the first and second filters, respectively;
   said first transmission line means having a length such that the impedance at the base end of said second radiating element in said second frequency range is substantially equal to the characteristic impedance of said second transmission line means; and
   said second transmission line means having a length such that the impedance at the base end of said first radiating element in said first frequency range is substantially equal to the characteristic impedance of said first transmission line means, whereby the first and second inputs provide impedance matches at the first and second frequency ranges, respectively.

2. The antenna according to claim 1 wherein N is one.

3. The antenna according to claim 2 wherein the length and characteristic impedance of said third transmission line means are selected intermediate of said first and second frequency ranges to cause an impedance at the base end of said second radiating element equal to the characteristic impedance of said second transmission line means with the base end of said first radiating element having a short circuit.

4. The antenna according to claim 1 wherein said first and second transmission line means each has the same characteristic impedance.

5. The antenna according to claim 1 wherein said first and second radiating elements each has a length intermediate the first and second frequency ranges greater than 1/20 of a wavelength and less than ¼ of a wavelength.

6. The antenna according to claim 1 in which the impedance match between said first tranmission line means and said first filter over said first frequency range and the impedance match between said second transmission line means and said second filter over said second frequency range each provide a standing wave ratio not greater than 2:1.

7. The antenna according to claim 1 wherein the third transmission line means is a planar serpentine conductive pattern.

8. In a portable two-way wireless radio including a receiver which receives signals in a first frequency range, a transmitter which transmits signals in a second frequency range, an antenna having first and second inputs corresponding to the first and second frequency ranges, and a housing in which the antenna is enclosed, the improvement in the antenna comprising:
   first and second spaced apart radiating elements each having a base end and a distal end;
   first transmission line means for connecting the base end of said first radiating element to a first filter having a predetermined impedance in the first frequency range and a substantial reactance in the second frequency range, the end of the first transmission line means which is connected to the first filter comprising said first input;
   second transmission line means for connecting the base end of said second radiating element to a second filter having a predetermined impedance in the second frequency range and a substantial reactance in the first frequency range, the end of the second transmission line means which is connected to the second filter comprising said second input;

third transmission line means for connecting the distal ends of said first and second radiating elements, said third transmission line means having an electrical length intermediate the first and second frequency ranges of approximately N/2 wavelengths where N is an integer greater than zero;

said first and second transmission line means having characteristic impedances equal to said predetermined impedances of the first and second filters, respectively;

said first transmission line means having a length such that the impedance at the base end of said second radiating element in said second frequency range is substantially equal to the characteristic impedance of said second transmission line means; and said second transmission line means having a length such that the impedance at the base end of said first radiating element in said first frequency range is substantially equal to the characteristic impedance of said first transmission line means, whereby the first and second inputs provide impedance matches at the first and second frequency ranges, respectively.

9. The radio according to claim 8 wherein N is one.

10. The radio according to claim 9 wherein the length and characteristic impedance of said third transmission line means are selected intermediate of said first and second frequency ranges to cause an impedance at the base end of said second radiating element equal to the characteristic impedance of said second transmission line means with the base end of said first radiating element having a short circuit.

11. The radio according to claim 8 wherein said first and second transmission line means each has the same characteristic impedance.

12. The radio according to claim 8 wherein said first and second radiating elements each has a length intermediate the first and second frequency ranges greater than 1/20 of a wavelength and less than ¼ of a wavelength.

13. The radio according to claim 8 in which the impedance match between said first tranmission line means and said first filter over said first frequency range, and the impedance match between said second transmission line means and said second filter over said second frequency range each provide a standing wave ratio not greater than 2:1.

14. The radio according to claim 8 wherein the third transmission line means is a planar serpentine conductive pattern.

15. An antenna having first and second inputs which correspond to first and second frequency ranges of operation of the antenna, the antenna comprising:

first and second spaced apart radiating element each having a base end and a distal end;

first transmission line means for connecting the base end of said first radiating element to a first circuit having a predetermined impedance in the first frequency range and a substantial reactance in the second frequency range, the end of the first transmission line means which is connected to the first circuit comprising said first input;

second transmission line means for connecting the base end of said second radiating element to a second circuit having a predetermined impedance in the second frequency range and a substantial reactance in the first frequency range, the end of the second transmission line means which is connected to the second circuit comprising said second input;

third transmission line means for connecting the distal ends of said first and second radiating elements, said third transmission line means having an electrical length intermediate the first and second frequency ranges of approximately N/2 wavelengths where N is an integer greater than zero;

said first and second transmission line means having characteristic impedances equal to said predetermined impedances of the first and second circuits, respectively;

said first transmission line means having a length such that the impedance at the base end of said second radiating element in said second frequency range is substantially equal to the characteristic impedance of said second transmission line means; and said second transmission line means having a length such that the impedance at the base end of said first radiating element in said first frequency range is substantially equal to the characteristic impedance of said first transmission line means, whereby the first and second inputs provide impedance matches at the first and second frequency ranges, respectively.

16. The antenna according to claim 15 wherein N is one.

17. The antenna according to claim 16 wherein the length and characteristic impedance of said third transmission line means are selected intermediate of said first and second frequency ranges to cause an impedance at the base end of said second radiating element equal to the characteristic impedance of said second transmission line means with the base end of said first radiating element having a short circuit.

18. The antenna according to claim 15 wherein said first and second transmission line means each have the same characteristic impedance.

19. The antenna according to claim 15 in which the impedance match between said first transmission line means and said first filter over said first frequency range, and the impedance match between said second transmission line means and said second filter over said second frequency range each provide a standing wave ratio not greater than 2:1.

20. The antenna according to claim 15 wherein said third transmission line means comprises a planar serpentine conductive pattern.

* * * * *